Patented Sept. 9, 1941

2,255,358

UNITED STATES PATENT OFFICE 2,255,358

PROCESS FOR THE PREPARATION OF SELENIUM FOR ELECTRICAL USES

Lloyd R. Jackson and Wendell F. Stewart, Columbus, Ohio, assignors to Battelle Memorial Institute, Columbus, Ohio, a corporation of Ohio No Drawing. Application September 16, 1940, Serial No. 356,980

7 Claims. (Cl. 175—366)

This invention relates to a process for the preparation of selenium for electrical uses. It is particularly related to the preparation of selenium for use in rectifying devices, although it is not limited thereto.

It is known to the prior art that selenium may be used in connection with electrical devices such as rectifiers and condensers. Selenium is particularly useful for these devices since it can be applied in such a way that a unidirectional electrical conductivity may be developed. However, its performance characteristics may be markedly modified by treatments which may be applied to the selenium after it is applied to the electrical devices. A large number of treatments have been suggested to improve the performance of selenium.

Since the uni-directional electrical characteristics of selenium are usually attributed to the presence of a thin film or blocking layer, practically all treatments heretofore proposed have involved some type of surface treatment. Coating of the selenium surface with materials such as selenium dioxide, various N-, O-, or S-containing organic compounds, polystyrene and treatment of the selenium surface with various organic reducing agents, sulfur fumes and other materials have been proposed. Combination of the selenium with other materials such as mercury compounds, metal salts or oxides and metal halides has also been suggested. In addition to the combination of these other materials with selenium, heat treatments of selenium rectifier plates at temperatures of 80° C. to the melting point of selenium have been described. While many of these treatments have been satisfactory in certain instances, erratic results have been frequently obtained and research has been continued to find a method for treating selenium which would produce satisfactory and uniform results.

A study of the prior art has determined that some methods of preparing pure selenium from commercial selenium result in a product which, to some extent, is satisfactory for use in rectifiers. Some of the methods of the prior art for preparing selenium from commercial selenium give a product which is not satisfactory. A study of the methods described in the literature and a following thereof have resulted in failure to make selenium satisfactory for use in rectifiers. In addition, we have substantiated, by experiment, the fact that some commercial selenium products are satisfactory and other commercial selenium products are unsatisfactory for rectifier use.

One of the objects of this invention is to prepare selenium for electrical uses in such a manner that it will have superior properties in comparison with the selenium now available.

Another object of this invention is to produce selenium for electrical rectifiers which will make it possible to manufacture rectifiers having a low resistance in the forward direction and a high resistance in the rearward or reverse direction.

Still another object of this invention is to produce a more effective blocking layer on selenium rectifier plates than hitherto obtainable.

A further object of this invention is to provide a process for the treatment of selenium which will produce more reliable and consistent results than those hitherto obtainable.

In the course of our study of selenium and the use thereof for the purposes indicated, it has been found that it is not sufficient merely to apply treatments to selenium rectifier plates after they are formed but that certain treatments must be given the commercial selenium before it is formed into rectifier plates or other elements where the rectifying properties of selenium are to be utilized. In other words, we have determined that the methods of preparation of the selenium itself before it is applied for use in rectifying elements are important in obtaining good results in use and that a neglect of this fact has hitherto been responsible for many of the erratic results obtained in use. Likewise, we have found that certain special preparation treatments must be followed to obtain optimum results.

Commercial selenium is preferably used as the raw material in the practice of this invention. Various brands of commercial selenium have been subjected to our process for treatment and equally successful results have been obtained for all such brands.

In the method which we preferably use, commercial selenium is first dissolved in concentrated (70%) nitric acid and filtered. This treatment removes $SiO_2$ and other impurities insoluble in $HNO_3$.

The second step of our preferred method consists in evaporating the clear filtrate to dryness, leaving a residue of $SeO_2$.

The third step in our preferred method consists in adding ammonium hydroxide (28%) to the $SeO_2$ residue and then adding hydrochloric acid (37%) to the solution until it is acidic. The opposite order (i. e., adding the HCl first) may be used or the HCl and $NH_4OH$ may be mixed before adding to the $SeO_2$ residue. In any event the final solution must be acidic. A portion of the acid is contributed by the $SeO_2$ which forms selenious acid upon solution.

This third step as described is in the preferred form, since highly purified HCl and $NH_4OH$ are cheaper and easier to secure than highly purified $NH_4Cl$. However, if it is possible to secure suitably purified $NH_4Cl$, it may be used for this treatment. It has been found that the presence of ammonium and chlorine ions in an acidic solution at this stage of the purification process is desirable in the production of satisfactory selenium.

In the fourth step, when the solution has reached the acidic state, as outlined above, it is cooled to 40° F. and $SO_2$ is bubbled through the solution to precipitate the selenium. This precipitation reaction evolves heat and it is necessary to remove this heat to keep the solution temperature below 110° F. As long as the temperature is held below this point the selenium precipitates out in a finely divided red form which can then be washed effectively but if the temperature rises much above this point the selenium precipitates as a black pasty mass which cannot be properly washed.

In the fifth step of our process, the selenium precipitate is washed in cold distilled water, after which it is washed in hot distilled water which changes it to the gray metallic form.

In the sixth step of our process, the selenium is agglomerated by melting it down and is then heated to its boiling point for a few minutes and then cast. This boiling treatment is necessary to produce a dense non-porous selenium upon solidification which will not crack when applied to a rectifier plate. After boiling, the selenium is used as needed or may be cast into stick form for subsequent use.

In the seventh step of our method, when the selenium is to be applied to a rectifier plate, it is first melted and heated to about 600° F. and placed on a sandblasted nickel surface. It is then given a primary aging treatment by any of the conventional methods, as by heating the plate with the selenium surface under pressure for ½–3 hours at about 260–380° F., removing the pressure and continuing the aging for 1–3 hours at 380–415° F. Ordinarily, following this treatment or other treatments at elevated temperatures for varying lengths of time, the front electrode is applied.

The eighth step of our preferred method consists in delaying the application of the front electrode for a considerable length of time and holding the exposed selenium surface at room temperature during this period. This room temperature secondary aging treatment produces results which cannot be duplicated by treatments at elevated temperatures. A much superior rectifying element may thus be produced.

Three of the most important features of our method are especially applicable in the production of selenium for use in the making of rectifiers. These features are:

(1) The use of $NH_4OH$ (presence of $NH_4$ ions) in the solution from which selenium is precipitated.

(2) Boiling of purified selenium prior to application.

(3) Room-temperature, secondary aging of the selenium after it has been applied.

Specific examples of the advantages of this invention will be shown below. In comparing the results obtained it should be remembered that there are two important properties of rectifier elements. One is the resistance in the forward direction while the other is the resistance in the reverse direction. It is desirable that the first be low and the second be high. In comparing the performance of various rectifying elements it is important to take both of these elements into consideration. The efficacy of the use of $NH_4$ ions in the precipitating solution may be seen from Table I.

TABLE I.—*Effect of use of $NH_4$ ions in selenium precipitating solutions*

| Sample No. | $NH_4OH$ in solution | Measure of forward resistance | | Measure of reverse resistance | |
|---|---|---|---|---|---|
| | | Volts to pass 0.5 amp. | Percent of performance by base sample | Milliamps. at −10 volts | Percent of performance by base sample |
| 544 | No | 0.9 | 133 | 900 | 0.32 |
| 545 | No | 1.2 | 100 | 900 | 0.32 |
| 905 | No | 0.9 | 133 | >3000 | <0.097 |
| 906 | No | 1.0 | 120 | >3000 | <0.097 |
| 662 | Yes | 1.2 | 100 | 3.8 | 76 |
| 663* | Yes | 1.2 | 100 | 2.9 | 100 |

*Base sample.

It is obvious that the use of the $NH_4$ ions in the selenium solution does not have any great effect upon the resistance of the element in the forward direction but that the effect of the presence of these ions upon the resistance in the reverse direction is extremely high.

The effects of the selenium boiling treatment are not easily described numerically but can be better described in their effect. If this boiling treatment is not used, the selenium, as applied, tends to crack and be porous. These openings in the selenium layer allow the facing layer to contact the backing layer and thereby "short out" the selenium layer. This, of course, ruins the rectifying properties of the element.

The room temperature secondary aging treatment appears to be most effective in increasing the resistance of the rectifying element in the reverse direction. The effect of this treatment as applied to units which had received otherwise identical treatments is shown in Table II.

TABLE II.—*Effect of room temperature secondary aging treatment*

| Sample No. | Aging time, hours | Measure of forward resistance | | Measure of reverse resistance | |
|---|---|---|---|---|---|
| | | Volts to pass 0.5 amp. | Percent of performance by base sample | Milliamps. at −10 volts | Percent of performance by base sample |
| 658 | 1½ | 1.0 | 120 | 105.0 | 2.8 |
| 659 | 5 | 1.0 | 120 | 75.0 | 3.9 |
| 660 | 20 | 1.0 | 120 | 75.0 | 3.9 |
| 661 | 36 | 1.2 | 100 | 5.4 | 53.7 |
| 662 | 60 | 1.2 | 100 | 3.8 | 76.5 |
| 663* | 89 | 1.2 | 100 | 2.9 | 100.0 |

*Base sample.

It is apparent that this treatment greatly improves (increases) the resistance in the reverse direction without seriously affecting the resistance in the forward direction. This is an important point since treatment at elevated temperatures may increase the resistance in the reverse direction but only at the expense of increasing the resistance in the forward direction. This is best illustrated in Table III.

TABLE III.—*Effect of temperature of secondary aging*

| Sample No. | Aging time, hours | Aging temp., °F. | Measure of forward resistance | | Measure of reverse resistance | |
|---|---|---|---|---|---|---|
| | | | Volts to pass 0.5 amp. | Percent of performance by base sample | Milliamps. at −10 volts | Percent of performance by base sample |
| 532 | 1¼ | 360 | 1.3 | 77 | 400 | 18.8 |
| 658 | 1½ | Room | 1.0 | 100 | 105 | 71.5 |
| 540 | 3 | 380 | 2.0 | 50 | 200 | 37.4 |
| 659* | 5 | Room | 1.0 | 100 | 75 | 100.0 |

*Base sample.

The secondary aging effect cannot be entirely explained as due to air oxidation since it may also be observed in the absence of air. Another series of samples treated in various atmospheres is given in Table IV. All of the samples are of substantially the same performance characteristics.

TABLE IV.—*Effect of atmosphere on secondary aging*

| Sample No. | Aging time, hours | Aging atmosphere | Measure of forward resistance | | Measure of reverse resistance | |
|---|---|---|---|---|---|---|
| | | | Volts to pass 0.5 amp. | Percent of performance by base sample | Milliamps. at −10 volts | Percent of performance by base sample |
| 899* | 41 | Air | 1.3 | 100 | 42 | 100.0 |
| 673 | 70 | Dry O₂ | 1.1 | 118 | 43 | 97.6 |
| 674 | 70 | Dry N₂ | 1.2 | 108 | 39 | 107.5 |
| 675 | 70 | Vacuum | 1.2 | 108 | 70 | 60.0 |

*Base sample.

One specific example of the manner in which our process was performed is as follows:

(1) 300 grams of commercial selenium were dissolved in 750 cc. of 70% HNO₃ and filtered.

(2) The clear filtrate was evaporated to dryness.

(3) 1000 cc. of NH₄OH (28%) and 1000 cc. of HCl (37%) were added to the residue.

(4) The solution was cooled to 40° F. and SO₂ bubbled through the solution. The solution temperature was held below 110° F. during precipitation of the selenium.

(5) The finely divided, precipitated selenium was washed four times in cold (not over 70° F.) distilled water and three times in hot (100–200° F.) distilled water.

(6) The precipitated selenium was agglomerated by melting. It was then heated to boiling for 1–5 minutes and cast into stick form.

(7) The prepared selenium was melted on a sandblasted nickel surface at 600° F. This selenium coating was aged under pressure at 380° F. for 1 hr., after which the pressure was removed and aging continued for about 1½ hours at 380° F.

(8) The completed plate was allowed to age at room temperature for 36 hours or more.

The product prepared according to this example was similar in performance to samples 663, 662 and 899 which have been described as base samples. It should be emphasized that the behavior of selenium rectifier plates appears to be a function of relatively small amounts of various impurities which cannot be detected by any ordinary means. For this reason any procedure which can be worked out for the treatment of the selenium used in these plates must be empirical and frequently it is impossible to explain or postulate reasons for observed characteristics. It is, therefore, desirable to substantially follow the procedure which has been outlined in order that consistent and reproducible results may be obtained. Even with the most careful work minor deviations may be expected although for commercial practice these may be neglected.

It will be seen from the above that we have devised a process for the preparation of selenium for electrical uses that results in a selenium having superior properties in comparison with the selenium now available. It will also be apparent that, by our process, we are able to produce a selenium for use in electrical rectifiers which will have a low resistance in the forward direction and a high resistance in the rearward or reverse direction, particularly when applied to a rectifier plate. Thus, we are able to produce a more effective blocking layer on selenium rectifier plates than hitherto obtainable. Likewise, by the use of our process, more reliable and consistent results are obtainable. In addition, we are able, by the use of our process, to produce more effective rectifier plates.

Having thus described our invention, what we claim is:

1. A method of preparing selenium for electrical uses which comprises dissolving the selenium in nitric acid, filtering off the insoluble residue, drying the filtrate, dissolving the dried filtrate in an acid solution containing ammonium and chlorine ions, precipitating the selenium with sulfur dioxide, washing the precipitated selenium, agglomerating the precipitated selenium, heating it at the boiling temperature for a short time and casting it.

2. A method of preparing selenium coated plates for electrical uses which comprises dissolving the selenium in nitric acid, filtering off the insoluble residue, drying the filtrate, dissolving the dried filtrate in an acid solution containing ammonium and chlorine ions, precipitating the selenium with sulfur dioxide, washing the precipitated selenium, agglomerating the precipitated selenium, boiling it before use, casting the selenium on a base plate, heat treating the coated plate, and aging it at room temperature for 36 hours or more.

3. A method of preparing selenium for electrical uses which comprises dissolving the selenium in nitric acid, filtering off the insoluble residue, drying the filtrate, dissolving the dried filtrate in an acid solution containing ammonium and chlorine ions, precipitating the selenium with sulfur dioxide, washing the precipitated selenium, agglomerating the precipitated selenium, boiling it before use, applying the selenium to a base plate with a suitable heat treatment and aging the completed plate at room temperature.

4. A method of preparing selenium for electrical uses which comprises dissolving the selenium in nitric acid, filtering off the insoluble residue, evaporating the filtrate to dryness, dissolving the dried filtrate in an ammoniacal solution, adding hydrochloric acid to the ammoniacal solution until the resultant solution is acid, precipitating the selenium with sulfur dioxide, washing the precipitated solution, agglomerating the precipitated selenium, heating it to a boiling temperature for a few minutes and then casting.

5. A method of preparing selenium for electrical uses which comprises dissolving the selenium in nitric acid, filtering off the insoluble residue, drying the filtrate, dissolving the dried filtrate in an ammoniacal solution, adding hydrochloric acid to such ammoniacal solution until the resultant solution is acid, precipitating the selenium with sulfur dioxide, washing the precipitated selenium, agglomerating the precipitated selenium and boiling it before use, applying the selenium to a base plate with a suitable heat treatment and aging the selenium coated plate at room temperature.

6. A method of preparing selenium for electrical uses which comprises dissolving the selenium in nitric acid, filtering off the insoluble residue, evaporating the filtrate to dryness, and dissolving the dried material obtained from the filtrate in a solution containing ammonium, hydrogen, and chlorine ions.

7. A method of preparing selenium for electrical uses which comprises dissolving the selenium in nitric acid, filtering off the insoluble residue, evaporating the filtrate to dryness, dissolving the dried material obtained from the filtrate in ammonium hydroxide and acidifying the resulting solution with hydrochloric acid.

LLOYD R. JACKSON.
WENDELL F. STEWART.